United States Patent [19]
Babbin et al.

[11] 3,946,918
[45] Mar. 30, 1976

[54] HOSE FEEDER

[75] Inventors: William R. Babbin; Stephen C. Sabo, both of Barberton, Ohio

[73] Assignee: The B. F. Goodrich Company, Akron, Ohio

[22] Filed: June 23, 1975

[21] Appl. No.: 589,712

[52] U.S. Cl. .................... 226/1; 226/172; 425/325; 425/392
[51] Int. Cl.² .......................................... B65H 17/24
[58] Field of Search ................... 226/172, 173, 1; 264/DIG. 65, 89, 93, 236, 347; 156/149; 425/325, 392; 214/17 B; 34/232; 432/8, 59

[56] References Cited
UNITED STATES PATENTS

| | | | |
|---|---|---|---|
| 2,319,300 | 5/1943 | Cook | 432/8 |
| 3,737,490 | 6/1973 | Nicholson | 264/40 |
| 3,866,882 | 2/1975 | Willm et al. | 226/172 |
| 3,893,465 | 7/1975 | Cheatwood | 425/392 |

*Primary Examiner*—John J. Love
*Assistant Examiner*—Robert Saifer
*Attorney, Agent, or Firm*—Harry F. Pepper, Jr.; W. A. Shira, Jr.

[57] ABSTRACT

Limp, elastomeric hose is fed through a pressurized chamber having an inlet and an outlet opening, the outlet opening leading directly to a pressurized hose treatment zone. Seals at both the inlet and outlet opening of the chamber simultaneously permit continuous passage of hose and prevent escape of the pressurizing fluid from the chamber and from the treatment zone. The hose is driven from the inlet end of the chamber up to and out of the outlet seal of the chamber, and into the treatment zone by a pair of vertically spaced substantially mutually parallel, endless, flexible belts disposed within the chamber.

9 Claims, 2 Drawing Figures

HOSE FEEDER

BACKGROUND OF THE INVENTION

This invention relates to the treatment of hose and more particularly to the feeding of limp, elastomeric hose into a pressurized treatment zone.

In many elastomeric hose manufacturing processes, high temperature and pressure are required. In elastomeric hose treatments such as curing, high pressure is sometimes required to prevent blowing, blistering or other hose defects. High temperature of the pressurizing medium is, of course, required to effect a cure. To create a high temperature and pressure atmosphere in a hose process such as curing, a liquid environment, for example a type of oil, is sometimes used.

Elastomeric hose is usually built on a flexible, solid rubber form or mandrel. One purpose of the mandrel is to support the hose from the inside during its cure, thereby preventing blowing or blistering on the inside of the hose and assuring a proper inside diameter of the hose. Hose may be cured by either "batch" processes or "continuous" processes.

One "batch" method comprises taking a length or lengths of elastomeric hose and placing them in a curing zone such as an oven or vat. The designated lengths of hose can be cut and cured in a linear configuration or can be coiled around a drum or spool before curing. Because of the high pressure required, the curing zone must be completely sealed from the outside environment.

Sealing the curing zone in known batch methods presently poses no serious problems. Furthermore, there are not great handling problems with the batch method, since each batch of hose is handled only when it is placed in and removed from the curing zone. A clear disadvantage of the batch method is the labor and equipment required to handle each batch and the shutdown time of the treatment apparatus between each batch.

In "continuous" methods of curing elastomeric hose, the end of a length of hose is fed into a curing zone and is constantly moved through the curing zone, the remainder of the length following behind it. Theoretically, an endless length of hose can be processed with only one initial continuous feeding procedure. Significant reductions in labor and time required are thereby achieved, thus increasing the productivity of the apparatus.

One continuous hose processing method suggested in U.S. Pat. No. 3,475,397 is helical path curing process and apparatus. This method suggests using a hot, oily liquid to cure and to move the hose through the curing zone. Problems can arise, however, if such liquid is pressurized. Some type of inlet seal is required to maintain the pressurized liquid in the curing zone while simultaneously allowing continuous admittance of the uncured elastomeric hose. It should be noted that, although uncured elastomeric hose is sometimes processed while on a flexible mandrel, it is still extremely limp and highly susceptible to damage due to handling. Safety problems have also existed with such pressurized systems. If the inlet seal should fail, the hot, pressurized oil used in many cure processes can escape, possibly injuring persons or damaging nearby equipment.

Further problems exist with a continuous hose curing process in that the hose must be handled essentially continuously throughout the process. For example, feeding the hose into the curing zone requires a continuous feeding force applied to the portion of the hose entering the curing zone. Excessive feeding forces may be required to overcome the resistant forces applied to the hose by the pressure in the treatment zone and by the inlet seal. The aforementioned problems of damaging the uncured hose persist when any excessive feeding force must be applied.

These problems are further complicated by the extremely limp characteristics of the hose. The aforementioned forces that resist entrance of the hose into a pressurized curing zone can cause the limp hose to bend along its axis even when small feeding forces are applied.

SUMMARY OF THE INVENTION

It is an object of this invention to provide an elastomeric hose feeding apparatus for use in conjunction with a pressurized elastomeric hose treatment apparatus such as a pressurized curing chamber.

It is a further object of this invention to provide an elastomeric hose feeding apparatus that provides a safety barrier for a pressurized hose treatment apparatus used in conjunction with the feeding apparatus.

It is a further object of this invention to provide an elastomeric hose feeding apparatus which will in effect stiffen limp, uncured hose as it is fed into an associated pressurized treatment zone.

It is a further object of this invention to provide a method of continuously feeding limp, uncured elastomeric hose into a treatment zone without damaging the hose by effectively stiffening the uncured hose.

These and other objects of this invention, which will become evident from the description of the invention which follows, are achieved by feeding the hose through a pressurized chamber having an inlet and an outlet opening, the outlet opening leading directly to a pressurized treatment zone. Seals at both the inlet and outlet openings of the chamber simultaneously permit continuous passage of hose and prevent escape of the pressurizing fluid from the chamber and from the treatment zone. The hose is driven from the inlet end of the chamber up to and out of the outlet seal of the chamber, and into the treatment zone by a pair of vertically spaced substantially mutually parallel, endless, flexible belts disposed within the chamber.

DESCRIPTION OF A PRESENTLY PREFERRED EMBODIMENT

Figure 1:
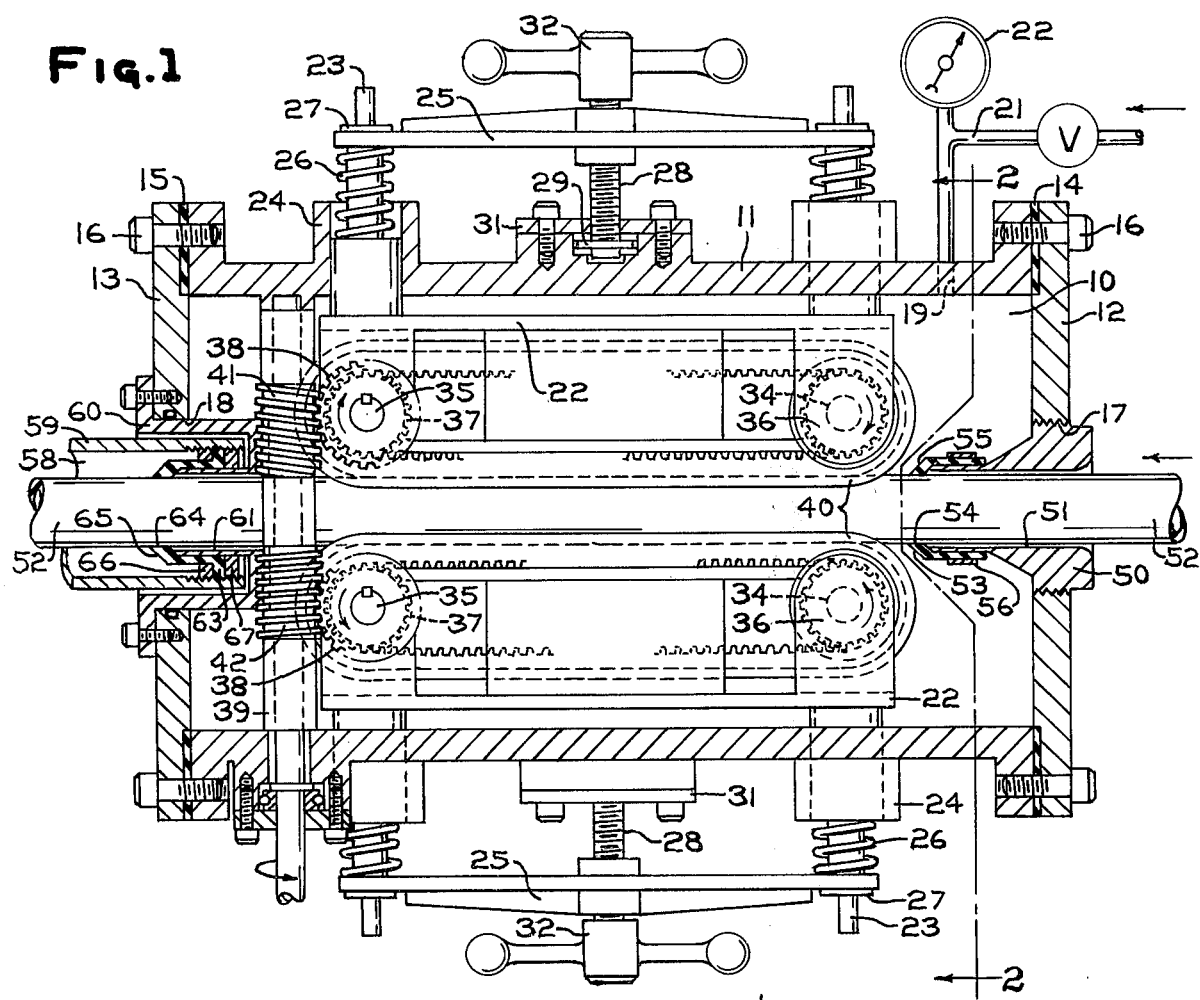
FIG. 1 is a vertical sectional view of the feeding apparatus taken from the side.
Figure 2:
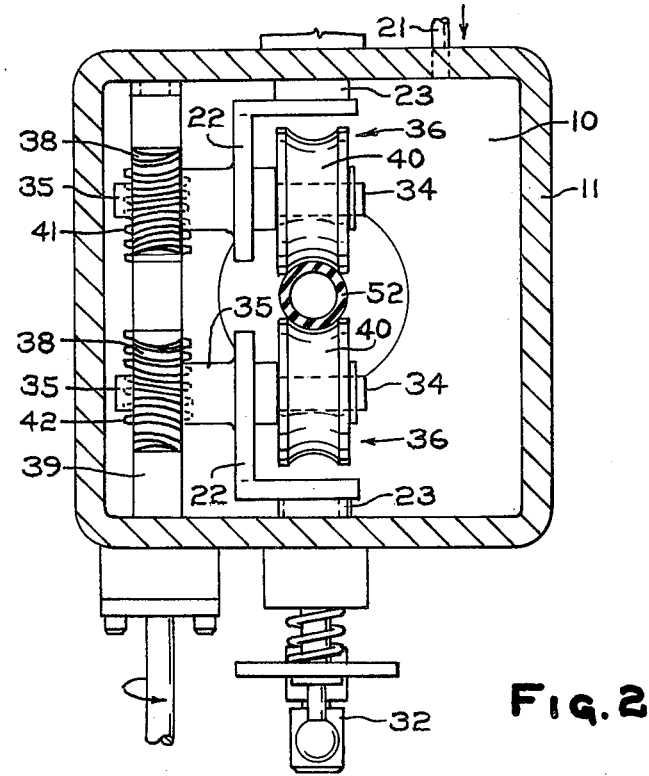
FIG. 2 is a sectional view of the feeding apparatus taken along line 2—2 of FIG. 1.

Referring to FIG. 1, a chamber 10 is formed by a housing 11 having an inlet wall 12 and an outlet wall 13. Wall gaskets 14 and 15 are disposed between the housing 11 and the inlet and outlet walls 12 and 13, respectively to insure an airtight seal. Cap screws 16 lock the walls 12 and 13 in position. The inlet wall 12 contains a threaded inlet seal housing opening 17 to permit acceptance of an inlet seal housing 50. The outlet wall 13 contains an outlet seal housing opening 18 to permit acceptance of an outlet seal housing 60.

The housing 11 contains an aperture 19 for pressurizing the chamber 10. The aperture 19 is connected to a fluid pressure source (not shown) by suitable piping means 21. A pressure gage 22 is connected to the piping means 21 to indicate the pressure within the chamber 10. Suitable valve means V are provided in the piping means 21.

Within the chamber 10 are two essentially parallel, vertically adjustable gearbelt support plates 22.

Rigidly connected to each support plate 22 is a set of two vertical plungers 23 which assist in the vertical adjustment of the support plate 22. Each plunger 23 is disposed partially within the chamber 10 and partially within a plunger housing 24 outside chamber 10 which assists in the vertical alignment of its associated plunger 23. Although each plunger 23 is vertically movable within its associated housing 24, each plunger 23 forms an airtight seal with its associated housing 24. Around each plunger 23 is a vertical helical spring 26. Outside of the chamber 10 an adjusting plate 25 extends between each set of plungers 23 and is biased by the spring 26 on each plunger 23. Each spring 26 is compressed such that one end of each spring 26 bears against a portion of its associated plunger 23 while the other end bears against its associated adjusting plate 25. A retaining ring 27 fastened to each plunger 23 limits the vertical movement away from the chamber 10 of each adjusting plate 25.

Each adjusting plate 25 is adapted to an adjusting screw 28. Each adjusting screw is secured to the housing 11 by suitable means, shown in FIG. 1 as a retaining ring 29 and a keeper plate 31. A threaded clamping handle 32 is screwed to each adjusting screw 28 on the opposite side of the adjusting plate 25 from the housing 11. By screwing either clamping handle 32 towards the housing 11, the handle 32 engages its associated adjusting plate 25 forcing it towards the housing 11. The adjusting plate 25 thereby compresses its associated springs 26, thereby forcing its associated plungers 23 into the chamber 10. The plungers thereby push their associated support plate 22 towards the other support plate, thus reducing the distance between the support plates 22.

An inlet pulley shaft 34 is rigidly attached to the inlet end of each support plate 22. Rotatably mounted on the end of each inlet pulley shaft 34 is an inlet gearbelt pulley 36. The inlet pulleys 36 are essentially free to rotate due to any force exerted on them. Rotatably mounted on the outlet end of each support plate 22 is an outlet pulley shaft 35. An outlet gearbelt pulley 37 is rigidly attached to one end of each outlet shaft 35. An endless gearbelt 40 extends between the inlet pulley 36 and the outlet pulley 37 of each support plate 22.

A drive gear 38 is rigidly attached to the end of each outlet shaft 35 opposite the outlet pulley 37. A vertical drive shaft 39 extends adjacent to both drive gears 38, and is provided with two worm gears 41 and 42, one being a right-handed gear and the other being a left-handed gear. The drive shaft 39 is driven by suitable drive means (not shown). Each worm gear 41 and 42 is operatively connected to a separate drive gear 38 such that upon rotation of the drive shaft 39, the worm gears 41 and 42 cause rotation of the two drive gears 38 in opposite directions.

An inlet seal housing 50 is hermetically mounted within the inlet seal housing opening 17 of the inlet wall 12. The inlet seal housing 50 contains an inlet opening 51 to permit entrance of limp, uncured elastomeric hose 52 into the chamber 10. Adjunct to the inlet seal housing 50 is an elastomeric inlet seal 53. The inlet seal 53 contains a frusto-conical flange 55 and a hose opening defined by an annular surface 54 on the flange 55. The annular surface 54 rides upon the surface of the elastomeric hose 52 as the hose enters the chamber 10. It is preferred that the annular surface 54 in contact with the hose 52 does not approximate a "point" surface, but rather has a width of from about 1/64 inch to 1/8 inch.

The frusto-concial flange 55 permits the fluid pressure in the chamber 10 to press the annular surface 54 lightly against the uncured hose 52. Thus, a hermetic seal is formed between the seal 53 and the hose 52 without causing grooving, stripping or other damage to the limp hose. The inlet seal 53 is adjustable with respect to the inlet seal housing 50 so that various types of hose 52 of differing diameters can be accommodated. The diameter of the inlet seal opening defined by annular surface 54 can be adjusted by axially moving the inlet seal 53 on the inlet seal housing 50. The seal 53 is then held in position by the seal clamp 56.

An outlet seal housing 60 is hermetically mounted within outlet seal housing opening 18 of the outlet wall 13. The outlet seal housing contains an outlet opening 61 to permit exit of the limp, uncured elastomeric hose 52 from the chamber 10. Adjunct to the outlet seal housing 60 is an elastomeric outlet seal 63. Outside the chamber 10 and adjacent the outlet seal housing 60 and outlet seal 63 is the inlet portion 58 of a hose treatment zone defined by a portion 59 of a treatment zone housing such as a curing chamber. Similar to the inlet seal 53, the outlet seal 63 contains a frusto-conical flange 65 and a hose opening defined by an annular surface 64 on the flange 65. This surface 64 rides on the surface of the elastomeric hose 52 as the hose exits the chamber 10. Again, as in the inlet seal 53, the annular surface 64 of the flange 65 in contact with the hose 52 should have a width of from about 1/64 inch to 1/8 inch. The frusto-conical flange 65 allows the fluid pressure in the treatment chamber 58 to press the annular surface 64 lightly against the uncured hose 52 without damaging the hose.

Elastomeric outlet seal 63 rests on a portion of the outlet seal housing 60. The outlet seal 63 is held firmly in a predetermined position between a front spacer plate 66 and a rear spacer plate 67.

The outlet seal 63 can be adjusted to accommodate elastomeric hose of differing diameters by moving the front and rear spacer plates 66 and 67, thus sliding the seal 63 along a portion of the seal housing 60 and either expanding or contracting the annular surface 64 which defines the opening in the outlet seal 63.

Prior to operation, the opening defined by annular surface 54 of the inlet seal 53 and the opening defined by annular surface 64 of the outlet seal 63 are set to a predetermined diameter according to the size and type of hose 52 to be run through the chamber 10. The gearbelts 40 are properly positioned to accommodate the particular size of hose 52 by adjusting the gearbelt support plates 22 in the manner previously described. The drive shaft 39 is engaged, thereby driving the worm gears 41 and 42, the drive gears 38, ultimately the gearbelts 40, in opposite directions. In operation, the end of a length of uncured, limp elastomeric hose is hand fed into the unpressurized chamber 10 through the inlet seal housing 50 and the inlet seal 53. Since there is atmospheric pressure in the chamber 10, the frusto-conical flange 55 of the inlet seal 53 will only be lightly pressed against the limp hose, thereby allowing it to pass through the inlet seal 53 with little resistance.

The hose 52 is further hand fed into one end of the two gearbelts 40 which are being driven in a direction such that they grip the hose 52 and continuously pull it substantially parallel to its longitudinal axis through the inlet seal 53 and into the chamber 10. As the hose 52 emerges from the other end of the two gearbelts 40, it is continuously pushed up to and through the outlet seal 63 into the unpressurized treatment zone. After the initial portion of the hose 52 passes into the treatment zone, the chamber 10 and the treatment zone are pressurized to their operating pressure. The magnitudes of the pressures in the chamber 10 and the treatment zone are about the same. The chamber 10 preferably is pressurized to between about 80% and 100% of the pressure in the portion 58 of the treatment zone. A small pressure differential may be desired between chamber 10 and the portion 58 of the treatment zone to reduce any drag force which may be exerted by outlet seal 63.

The pressure in the treatment zone assists the outlet seal 63 in hermetically sealing the treatment zone from the chamber 10 by pressing the frusto-conical flange 65, and thus the annular sealing surface 64, against the surface of the hose 52. The net force on the flange 65 is due to the differential pressure between the treatment zone and the chamber 10.

The pressure in chamber 10 acts radially on all portions of the hose 52, thereby resisting any tendency of the hose to bend. Thus, the pressure in chamber 10 in effect stiffens the limp, uncured hose 52 and allows the hose to accept more force along the direction of its axis without bending.

The chamber 10 furthermore acts as a safety barrier in case of any failure of outlet seal 63. Since the treatment zone may be pressurized with a type of liquid such as oil which is typically in the temperature range of about 300° to 500°F for hose curing purposes, a break in the inlet seal of the treatment zone would cause the hot oil to flow out of the zone, possibly injuring nearby persons or damaging equipment. The chamber 10 acts as a safety barrier for any fluid escaping from the treatment zone.

Although the foregoing was described for the purpose of illustrating a presently preferred embodiment of the invention, it should be understood that many modifications or alterations may be made without departing from the spirit and the scope of the invention as set forth in the appended claims.

We claim:

1. A method of continuously feeding hose in a direction parallel to the longitudinal axis of the hose into a pressurized hose treatment zone, which comprises:
    a. pulling the hose into a pressurized feeding zone adjacent the treatment zone;
    b. pushing the hose into the hose treatment zone from the feeding zone.

2. A method of continuously feeding hose as described in the claim 1 wherein the magnitude of the pressure in the pressurized feeding zone is about the same as the magnitude of the pressure in the hose treatment zone.

3. A method of continuously feeding hose as described in claim 1 wherein pressure in the pressurized feeding zone is between about 80% and 100% of the pressure in the hose treatment zone.

4. A method of continuously feeding hose as described in claim 1 wherein the feeding zone is pressurized by a gas.

5. Apparatus for feeding elastomeric hose into a pressurized zone, the apparatus comprising:
    a. a chamber having an inlet opening and an outlet opening;
    b. means to pressurize the chamber;
    c. a plurality of endless, flexible belts within said chamber;
    d. means to drive said belts;
    e. an entrance sealing device at the inlet opening adapted to:
        1. permit continuous passage of elastomeric hose from said chamber while simultaneously;
        2. preventing escape of pressurizing fluid from said chamber and simultaneously;
        3. preventing escape of pressurizing fluid from said pressurized zone.

6. An apparatus as defined in claim 5 wherein two of the belts are vertically spaced and substantially mutually parallel.

7. An apparatus as defined in claim 6 wherein each of said two belts are mounted on an independently vertically adjustable support plate.

8. An apparatus as defined in claim 7 wherein said means to drive said two belts are adapted to drive said belts in opposite directions.

9. An apparatus as defined in claim 8 wherein the means to drive said two belts comprises a right-hand worm gear and a left-hand worm gear.

* * * * *